United States Patent [19]

Karlsson

[11] Patent Number: 4,606,966
[45] Date of Patent: Aug. 19, 1986

[54] CAMOUFLAGE CONTROLLING REFLECTION OF BOTH LONG AND SHORT RADAR WAVES

[75] Inventor: Lars G. Karlsson, Gamelby, Sweden

[73] Assignee: Diab-Barracuda AB, Laholm, Sweden

[21] Appl. No.: 771,495

[22] Filed: Aug. 30, 1985

Related U.S. Application Data

[63] Continuation-in-part of Ser. No. 597,163, Apr. 5, 1984, Pat. No. 4,557,965.

[30] Foreign Application Priority Data

Apr. 7, 1983 [SE] Sweden ................................ 8301908

[51] Int. Cl.⁴ ............................................... B32B 5/12
[52] U.S. Cl. .................................. 428/196; 428/209; 428/251; 428/252; 428/919
[58] Field of Search ............... 428/196, 209, 251, 252, 428/919

[56] References Cited

U.S. PATENT DOCUMENTS

| | | | |
|---|---|---|---|
| 3,733,606 | 5/1973 | Johansson | 428/919 |
| 4,001,827 | 1/1977 | Wallin | 428/919 |
| 4,034,375 | 7/1977 | Wallin | 428/919 |
| 4,287,243 | 9/1981 | Nielsen | 428/919 |
| 4,467,005 | 8/1984 | Pusch | 428/919 |

Primary Examiner—Marion C. McCamish
Attorney, Agent, or Firm—Lee, Smith & Zickert

[57] ABSTRACT

Camouflage material incorporates means for specifying and providing predetermined degree of reflection of incident radar waves which is optimum for particular use environments. The overall pattern is the resultant of control of reflection of longer radar wavelengths by a layer of electrically conductive fibrils of controlled density and reflection of shorter radar wavelengths by thin mosaic layer of metal.

13 Claims, 4 Drawing Figures

CAMOUFLAGE CONTROLLING REFLECTION OF BOTH LONG AND SHORT RADAR WAVES

RELATED APPLICATIONS

This application is a continuation-in-part of copending U.S. patent application Ser. No. 597,163, filed Apr. 5, 1984, U.S. Pat. No. 4,557,965.

BACKGROUND OF THE INVENTION

The object of this invention is to provide a thin camouflage material which reflects to a pre-determined extent radar waves in the W-band (96 GHz, 3 mm), K-band (35 GHz, 9 mm), and X-band (9 GHz, 30 mm). With optimum reflection of radar waves in all three wave bands, low emission of energy in the 3–5 um and 8–14 um wave band ranges, desirable also for thermal camouflage, is effected.

Throughout this application reference will be made to the reflection of the camouflage material. As is well-known, reflection is closely related to absorption and transmission. For materials that are thin compared with the wavelength, only one parameter (i.e., reflection, absorption or transmission) need be measured and the other parameters can be calculated using known physical equations and laws. Therefore, although reference below will generally be to reflection, there always are corresponding absorption and transmission values.

An important feature of the present invention resides in the ability that it offers to control the extent to which the radar waves of surveillance instruments are reflected to thwart detection of objects covered by the camouflage material. Separate but predeterminable and interacting means are provided to control the reflection of incident radar waves of differing wave lengths, making it possible to tailor the camouflage to the particular conditions obtaining in the location of use.

SUMMARY OF THE INVENTION

The camouflage material comprises a laminate of several thin layers, one of the layers being composed of a haphazard array of electrically conductive fibrils, another layer comprising a very thin film of metal which has been crackled or otherwise formed into a mosaic pattern of small, separate areas. In general, the fibril layer controls the reflection of the longer electromagnetic waves while the mosaic, metallic layer controls the reflection of the shorter waves.

Additional layers of the laminate provide supporting structure and also optical camouflage. Certain plastic films of the layers also contribute to thermal camouflage properties as will be described.

The fibrils or filaments employed in carrying out the invention may be composed of any of several different electrically conductive materials such as metals, ordinary steel being a useful example, and carbon fibers and metalized plastic fibers. They should be less than 20 microns in diameter. This dimension is not critical; filaments 8–10 microns in diameter, for example, being quite satisfactory from both practical usage and functional viewpoints. Furthermore, non-cylindrical filaments can be used with equal practicality.

The mosaic metal film layer may be provided by a very thin aluminum foil or by a vacuum deposited coating of, for example, aluminum on a plastic film carrier, the layer being broken up or crackled, subsequent to deposition.

The metal fibrils and mosaic metal layer may be incorporated into the camouflage material using any one of several different production procedures. These will be described with reference to the accompanying drawings which comprise four figures each of which is a schematic representation of a process of making an exemplary camouflage product and each of which embodies the invention while differing in particular respects.

BRIEF DESCRIPTION OF THE DRAWINGS

In the drawings, FIGS. 1, 2, 3, and 4 each illustrates diagrammatically one of four examples of camouflage materials embodying the invention and procedures for making them.

DESCRIPTION OF EXAMPLES

Embodying the Best mode of the Invention

Figure 1:
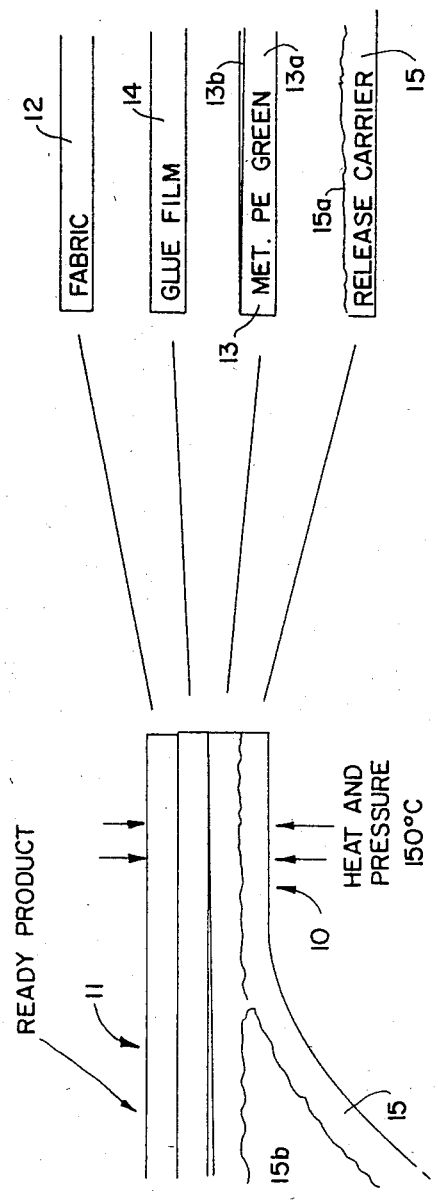

FIG. 1 illustrates a simple form of the invention. Four layers of material are brought together in a laminating machine 10 wherein the assembly is subjected to heat and pressure to produce the integrated laminated camouflage material 11. The principal supporting layer for the camouflage material is a layer 12 of fabric woven from, preferably, multifilament polyamide threads. Metal fibrils are incorporated into the fabric of the layer 12 by spinning the fibrils into the multifilament thread which is incorporated into the fabric. Since the portion of incident radar waves that will be reflected by the fibril-containing layer is proportional to the density of the metal fibril content of the fabric, a suitable layer 12 may be prepared by alternating fibril-containing threads with polyamide threads containing no metal or other conductive fibrils in both the warp and the weft of the woven fabric. The fibril content may comprise from two to five percent of the total fibril and polyamide filament content of the fabric. For example, a 5% metal fabric will reflect about 40% of incident electromagnetic waves in the X-band.

The layer 12, while described as a fabric, may alternatively be a polymer plastic, such as polyvinyl chloride film, as described in greater detail below particularly with respect to the embodiment of FIG. 3. In such case, the metal fibrils are either incorporated within the polymer film material, or, as also described below, the fibrils may be glued to the internal surface of the layer 12 or otherwise arrayed throughout the camouflage material 11.

Although not shown, the woven fabric of the layer 12 may be preliminarily laminated between two polyvinyl chloride films, if desired, and either the fabric or the plastic film may be colored green for optical camouflage effect if one side of the camouflage is to be exposed to visual inspection.

Layer 13 is a composite material comprising a film 13a of polyethylene or other suitable polymer film material, preferably colored green, with a coating 13b of a thin layer of a crackled metal, such as aluminum, which may have been vacuum deposited or otherwise laid on the plastic film of the supporting layer 13 in a known manner. A film 14 of glue is interposed between the fabric layer 12 and the metalized plastic layer 13 to secure the metal layer 13b to the supporting layer 12. Should the nature of the layer 12 be such that the metal layer 13b will adhere directly to the layer 12 during the laminating process, the glue film 14 can be omitted. A transfer release carrier or band 15 having a matte surface 15a is arranged to create a matte surface in the surface of the polyethylene film 13a opposite from the metal coating 13b, if a matte surface is desired. If a matte surface is unnecessary, the carrier 15 need not be specially treated to give a matte surface.

After lamination of the several layers, the transfer release carrier 15 is drawn away from the integrated camouflage material 11 leaving a matte surface 15b as the exposed surface of the outer, e.g., polyethylene film layer 13 of the camouflage material. This matte surface is desirable in order to avoid specular reflection of visible through thermal waves. Also, when heated to incipient fusion of the polyethylene film 13a, the pressure applied to the assemblage of layer 12 through 15 in the laminator causes the plastic material to press into the woven fabric of the layer 12 with the result that the thin coating layer 13b of aluminum is broken up into a mosaic pattern of small, separated individual areas.

The camouflage material of FIG. 1 will reflect radar waves to a predetermined extent depending especially upon the fibril content of the fabric of the layer 12 together with the crackled aluminum of the layer 13b and, in the manner more fully described in U.S. Pat. No. 4,529,633, emits energy in the thermal range only to the extent desired to avoid contrast with surrounding terrain and consequent detection by surveillance instruments. Optical camouflage is also provided.

Figure 2:
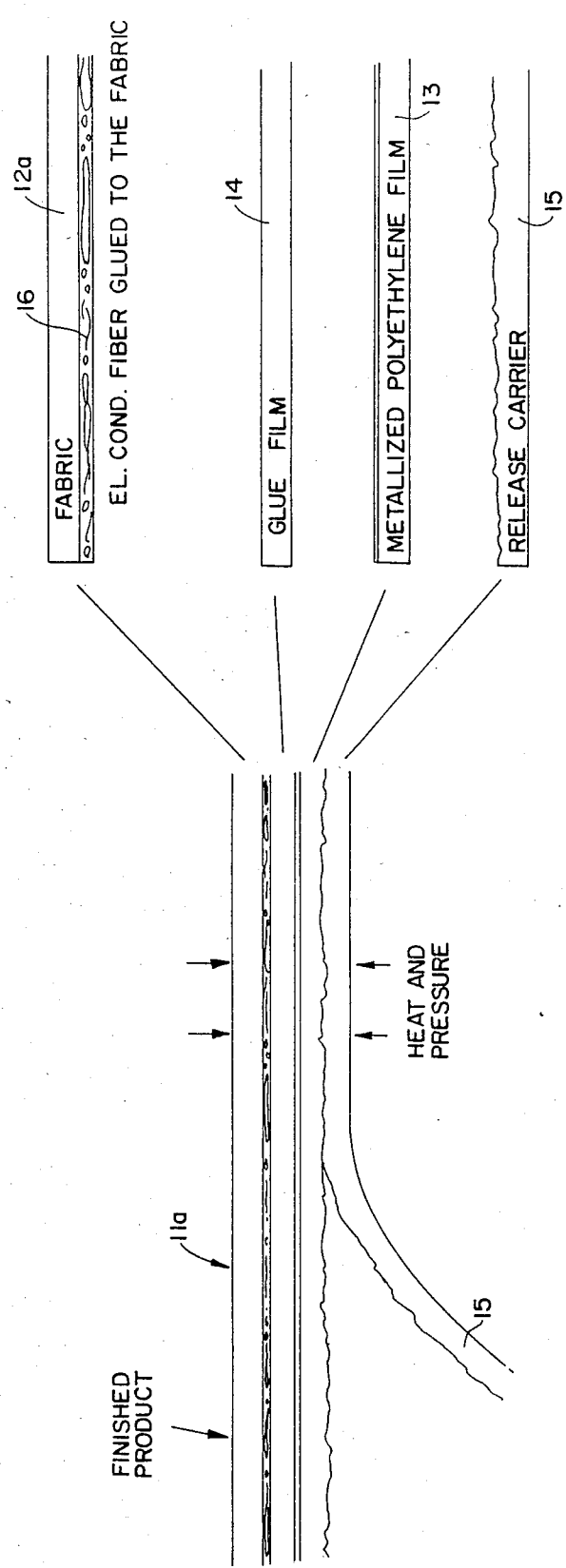

An alternative camouflage material and method of producing a camouflage material similar to that described with reference to FIG. 1, but having somewhat greater flexibility with respect to control of the extent to which radar waves are reflected, is illustrated in FIG. 2. In this case, a layer 12a may consist of a non-woven or woven fabric made entirely from monofilament or multifilament threads of polymer plastics. The sole function of the fabric is to support the camouflage material; no metal fibrils are contained in the thread. Instead, electrically conductive fibers of metal, carbon or metalized plastic are spread in a layer 16 over the surface of the fabric as described in U.S. Pat. No. 4,001,827 in unit amount sufficient to effect the predetermined proportionate reflection of radar waves. The use of a more or less standard supporting layer 12a and the separate application of the layer 16 of conductive fibrils offer more fascile flexibility for meeting specifications of the camouflage material as to the degree of reflection of radar waves. In addition to altering the density of a uniform layer of electrically conductive fibers, it would also be possible to vary the density to render reflection non-uniform in the same piece of camouflage material, if desired.

A metalized polyethylene film 13 is arranged to be adjacent the layer 16 of conductive fibrils, a film 14 of glue being interposed as needed to provide the desired adherence of the fabric 12a, conductive fibrils 6 and metalized film 13. For purposes already described, the release carrier 15 having an impressionable matte surface completes the array of layers fed into the laminator. After withdrawal of the release carrier 15 following lamination, the camouflage material 11a, is functionally similar to that above described with reference to FIG. 1.

In both FIGS. 1 and 2, in order to create a matte extension surface in the layer 13, use of the release carrier 15 is illustrated. Of course, if a matte surface is unnecessary, other types of release carriers can be utilized. Also, the matte surface can be created in many other manners, such as mechanically as with a roller, embossing the exterior surface of the layer 13 or applying a thin coating of another material which will create a matte look to the extension of layer 13. The invention is not limited to any particular surface on the layer 13.

Figure 3:
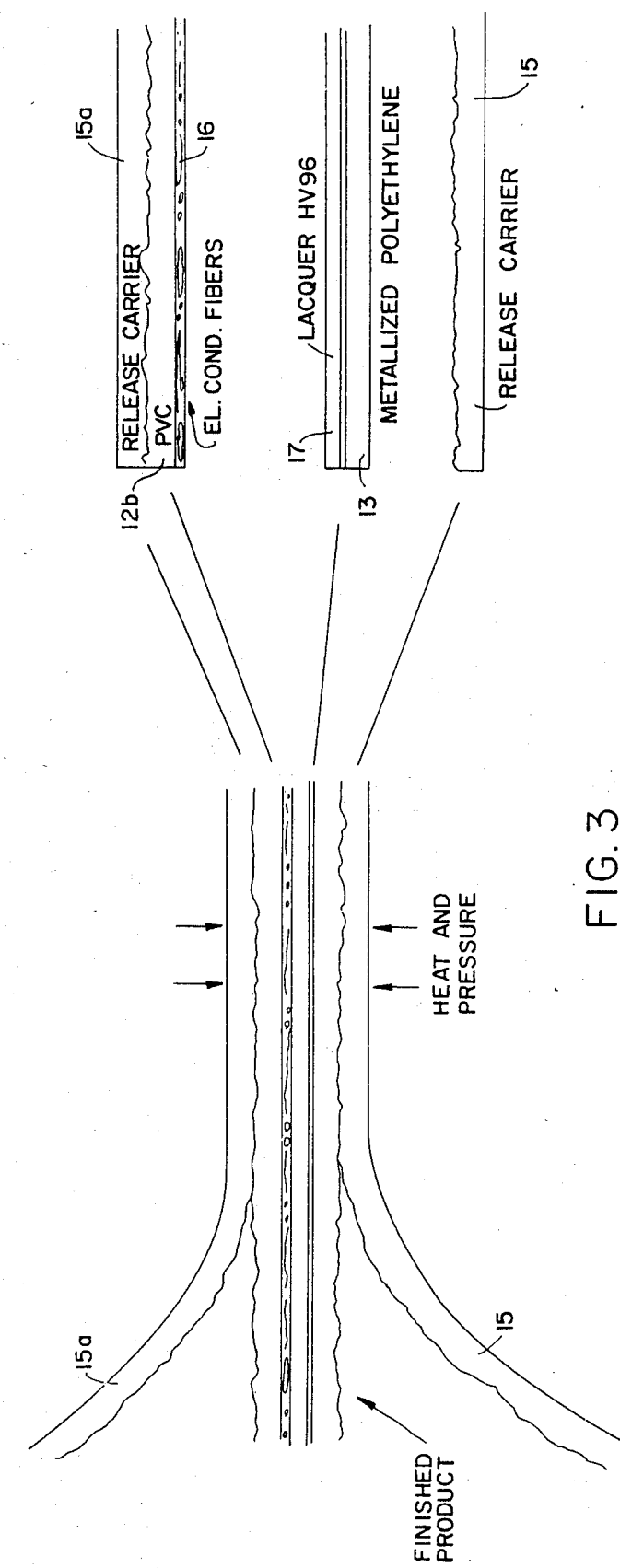

In the example illustrated in FIG. 3, a supporting film or layer 12 of polyvinyl chloride or other similar flexible film material is employed instead of a woven fabric. Electrically conductive fibers 16 are incorporated in or spread over one surface of polyvinyl chloride film layer 12b before curing and a matte-surfaced release carrier 15c is arranged to engage the other surface of the polyvinyl chloride film 12b if a matte exterior surface is desired. Instead of providing a separate film of glue (FIGS. 1 and 2) to secure the several layers of the laminate together, a coating 17 of a lacquer (e.g. Svensk Farg HV 96), may be used to bind the metalized polyethylene layer 13 and film 12b and electrically conductive fibrils 16 together. If a matte exterior surface is required, a release carrier 15 with its matte surface facing the layer 13 completes the array of layers fed into a laminator as indicated. After removal of the release carriers 15 and 15c, a camouflage material having the pre-determined reflection characteristics in all radar wave bands and thermal and optical camouflage features is produced.

Figure 4:
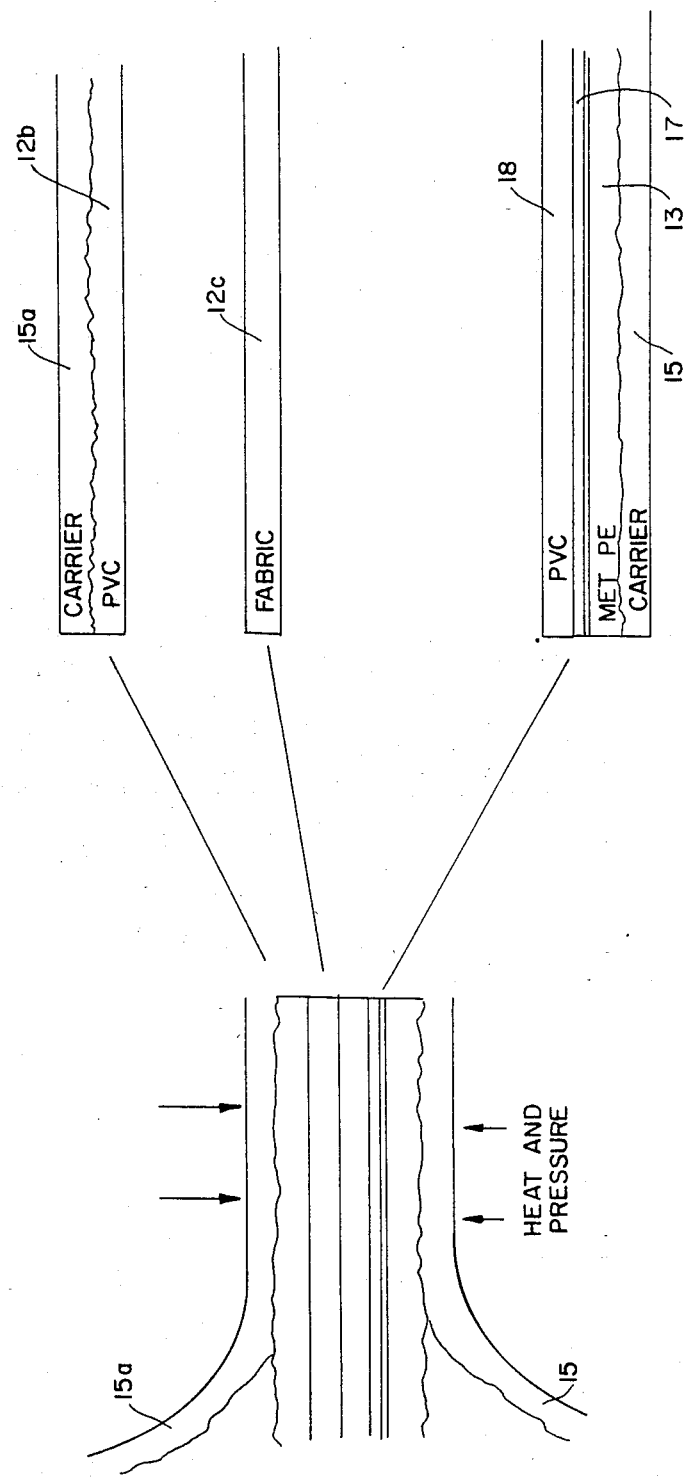

A particularly useful and efficient method of production of a camouflage material having two polymer film surfaces, a polyethylene surface on one side and a polyvinyl chloride surface on the other, is illustrated in FIG. 4. A duplex layer comprised of a matte-surfaced release carrier 15c having a coating of polyvinyl chloride plastisol over the matte surface is prepared in advance by curing the polyvinyl chloride. A sublaminate comprised of matte-surfaced release band 15, a layer of metalized polyethylene 13, a coating of lacquer 17 over the metal, and a layer of polyvinyl chloride plastisol 18 is prepared in advance by passing through a laminator. These subassemblies are then fed into a laminator with a supporting fabric 12c between them as shown. The supporting fabric may incorporate the conductive fibrils within the threads composing the fabric as described in relation to FIG. 1 or may have a separate layer of fibrils as illustrated and described with reference to FIG. 2. When the release bands have been pulled away, the result is a camouflage material having the desired radar reflecting characteristics and capable of presenting exterior surfaces having differing thermal emission properties since, as is well known, the emissivity of polymers such as polyvinyl chloride differs from the emissivity of polymers such as polyethylene, when combined with a metal layer.

The principal achievement of the invention herein described resides in the provision of a system that makes possible the production of camouflage material having a predetermined degree of reflection of electromagnetic waves in the radar spectrum, making possible the specification and production of optimum camouflage characteristics for the particular nature of the surroundings at the intended locations of use. The metal layer 13b and the electrically conductive fibrils, whether in a layer 16 or incorporated within the primary support layer 12, provide the radar camouflage characteristics. Optical and thermal camouflage are optionally provided along with the improved radar camouflage.

It should be evident that the primary conponents of the invention are the electrically conductive fibrils and the crackled metal layer. How these components are supported within the camouflage material is secondary, and several means of support have been described above with respect to FIGS. 1 through 4, although other means of support of the camouflage material could also be employed. Also, for visual and thermal camouflage properties, as well as a possible support for the crackled metal layer, the exterior layer has been illustrated and described as polyethylene. Other polymers or materials with similar properties e.g., polypropylene, could also be used, and a matte exterior need be provided only when required. The main support layer may be a fabric, a film or a similar layer, with the fibrils either incorporated therein or provided as a separate layer within the camouflage material. A glue or laquer is used for adhesion purposes, although other suitable adhesives can be used, or the separate adhesive layer can be omitted if the main support layer and metalized polymer layer will adhere to one another without the interposed adhesive. Also, in FIGS. 1 and 2, the metal layer is shown and described as applied to the polyethylene layer 13. The same result can be achieved if the metal layer is applied to the glue film 14 before laminating.

Various changes may be made to the invention without departing from the spirit thereof or scope of the following claims.

What is claimed is:

1. Camouflage material comprising a laminate including means for supporting portions of said camouflage material and embodying means for reflecting incident radar waves throughout the radar electromagnetic spectrum to a predetermined extent with respect to the wavelength ranges within said spectrum, said reflecting means comprising electrically conductive fibrils supported by said supporting means and arranged within said camouflage material and distributed throughout an area substantially coextensive with said camouflage material, said reflecting means further comprising a thin layer of crackled metal substantially coextensive with said camouflage material and supported by said supporting means, the density of said fibrils being such that in combination with said layer of crackled metal a predetermined degree of reflection of incident radar waves is attained throughout the radar electromagnetic spectrum.

2. Camouflage material in accordance with claim 1 wherein said supporting means includes a woven fabric layer of multifilament threads and said electrically conductive fibrils are contained within said thread.

3. Camouflage material in accordance with claim 2 wherein said thread is composed of polyamid.

4. Camouflage material in accordance with claim 2 wherein said thread is composed of polyamid and predetermined portion of said thread contains said fibrils incorporated therein.

5. Camouflage material in accordance with claim 1 wherein said supporting means includes a support layer substantially coextensive with said camouflage material and wherein said fibrils comprise a haphazard array of fibrils arranged and secured between said support layer and said layer of crackled metal.

6. Camouflage material in accordance with claim 5 wherein said support layer comprises a polymer film.

7. Camouflage material in accordance with claim 5 wherein said support layer comprises a woven fabric.

8. Camouflage material in accordance with claim 5 wherein said support layer comprises a nonwoven fabric.

9. Camouflage material in accordance with claim 1 wherein said supporting means includes a polymer layer disposed at the ultimately exteriorly exposed side of said camouflage material, said layer of crackled metal being secured to and interiorly of said polymer layer.

10. Camouflage material in accordance with claim 9 wherein said polymer layer has a matte outer surface.

11. Camouflage material in accordance with claim 1 wherein said electrically conductive fibrils are composed of steel.

12. Camouflage material in accordance with claim 1 wherein said electrically conductive fibrils are composed of carbon.

13. Camouflage material in accordance with claim 1 wherein said electrically conductive fibrils are composed of metalized plastic fibers.

* * * * *